United States Patent [19]
Groshens et al.

[11] Patent Number: 5,695,598
[45] Date of Patent: Dec. 9, 1997

[54] BONDING PRESS

[76] Inventors: Pierrot Groshens, 94 ter Rue Joliot Curie Flamicourt; Mohamed Foued Trabelsi, 18 Bd. du Poilu, both of 80200 Peronne, France

[21] Appl. No.: 770,225

[22] Filed: Jul. 17, 1996

Related U.S. Application Data

[63] Continuation of Ser. No. 363,538, Dec. 23, 1994, abandoned.

[30] Foreign Application Priority Data

Dec. 24, 1993 [FR] France ............................. 93 15641

[51] Int. Cl.⁶ .................................................. B30B 5/04
[52] U.S. Cl. .................. 156/498; 156/555; 156/583.5; 100/93 RP; 100/151; 425/371
[58] Field of Search ....................... 156/498, 555, 156/583.1, 583.5; 100/93 RP, 151, 154; 425/371

[56] References Cited

U.S. PATENT DOCUMENTS

| | | | |
|---|---|---|---|
| 3,461,019 | 8/1969 | Honsel | 156/583.5 X |
| 4,334,468 | 6/1982 | Guttinger et al. | 156/583.5 X |
| 4,787,947 | 11/1988 | Mays | 156/583.5 X |
| 5,131,973 | 7/1992 | Feldkamper | 156/583.5 X |

*Primary Examiner*—James Sells
*Attorney, Agent, or Firm*—Kane, Dalsimer, Sullivan, Kurucz, Levy, Eisele and Richard

[57] ABSTRACT

The invention concerns a bonding press for bonding, onto a cloth, a fusible interlining comprising a base fabric associated to one or more thermoadhesive and/or thermocrosslinkable adhesive polymer layer(s). According to the invention, the interlining/cloth complex trapped between the two conveyor belts (1, 2) passes through a second area (B) heated to a temperature greater than or equal to the melting temperature of the polymer(s) so as to allow for the chemical coupling reaction of the thermocross-linkable polymers in the interlining's adhesive layer.

8 Claims, 1 Drawing Sheet

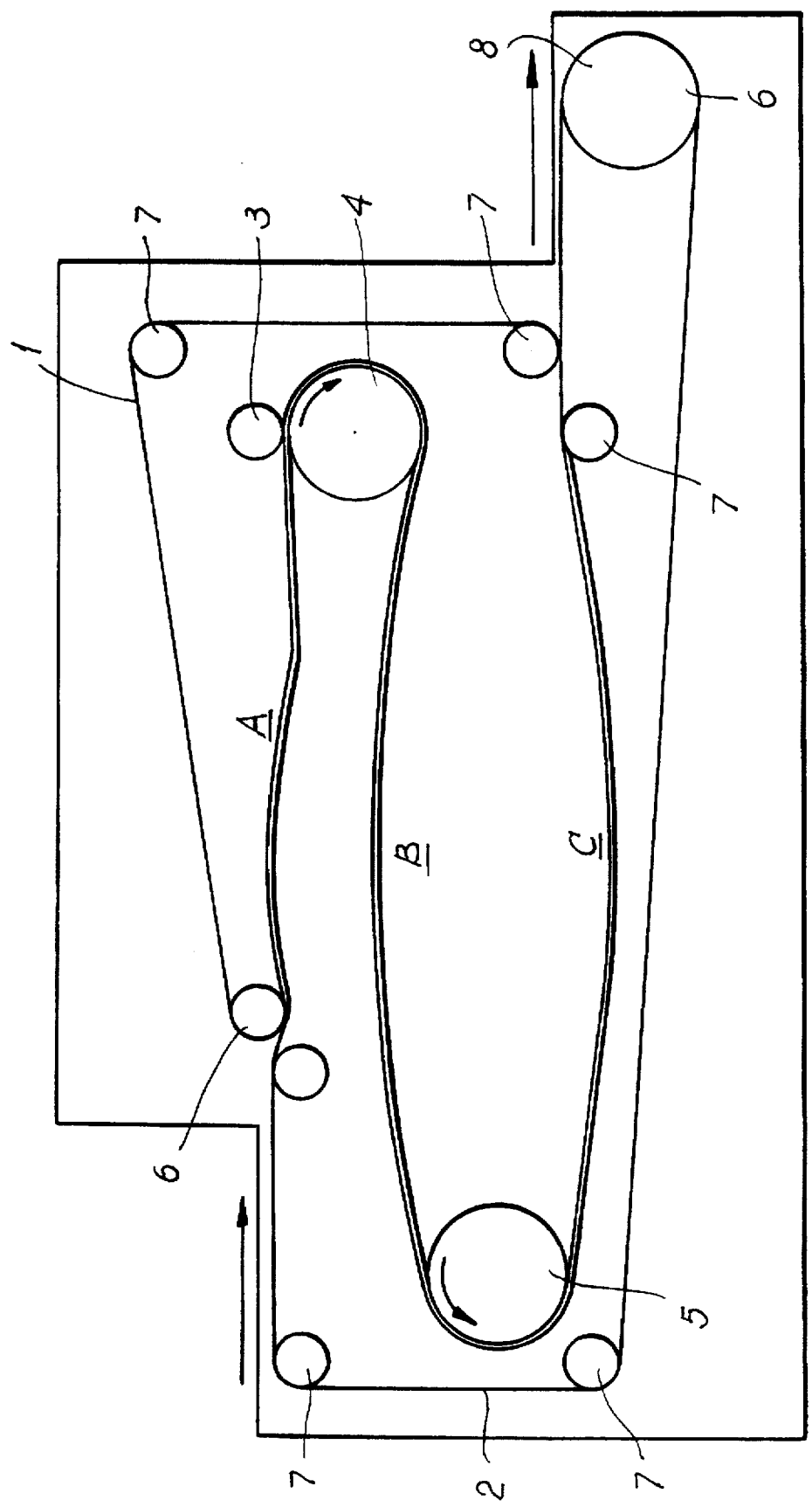

BONDING PRESS

This application is a continuation of application Ser. No. 00/363,538 filed Dec. 23, 1994, now abandoned.

BACKGROUND OF THE INVENTION

The invention concerns a bonding press. More specifically, the invention concerns a bonding press for bonding, onto a cloth, a fusible interlining comprising a base fabric associated to one or more thermoadhesive and/or thermocrosslinkable adhesive polymer layer(s).

Generally speaking, it must be possible to store fusible interlinings once their base fabric has received the polymer and they are ready to become, as a result of variations in external parameters, adhesive and thus capable of adhering to another fabric or cloth.

1. Field of the Invention

Fusible products are now commonly used in the textile industry, as an interlining, for example, with their application onto linings or cloths making it possible to modify the characteristics of the fabrics, thereby improving their resistance and springiness. The base fabrics used vary greatly. They can be woven, knitted or nonwoven.

There are many ways to apply the thermoadhesive layer on its base fabric. For repeated use, a point-by-point application is preferred as it makes it possible to preserve the fabric's softness, whereas for other uses a continuous adhesive layer makes it easier to obtain the properties sought.

In the case of an interlining, the base fabric is coated with the fusible substance. At present, this coating most often consists of a point-by-point coating carried out using heliographic (powder point by means of an engraved cylinder) or silk-screen (paste point by means of a rotary screen) techniques. Initially in powder or paste form, the fusible polymers are heated to a temperature enabling them to melt and thereby adhere to the base fabric.

The fusible interlining thus obtained is then stored at room temperature. It is therefore essential for the different layers of this product to not adhere together when in contact. The fusible interlining must not have any tack and adhesive properties at room temperature.

In the course of this storage, it is equally essential for the product's ageing process to not hinder the adhesive properties required for subsequent bonding.

The fusible interlining is then used by manufacturers who apply it onto other fabrics, cloths or linings and thus perform the bonding of the interlining on the cloth by means of a press, applying pressures ranging from a few decibars to a few bars for relatively short time of the order of 10 to 30 seconds, at temperatures usually above 100° C. During this stage, the polymers of the fusible interlining must recover their adhesive properties. Nevertheless, in the course of this operation their viscosity must not be too weak during too long a period of time, as otherwise the polymer passes through the base fabric or cloth causing turn-back problems which render the products obtained unattractive and often unusable.

Finally, the finished garment and the cloths or linings with interlining in particular must be able to withstand different forms of use, as well as washing, ironing, etc. The bonding performed during the previous stage must therefore withstand difficult cleaning treatments.

2. Description of the Prior Art

Many attempts have been made to achieve products perfectly adapted to the various constraints resulting from all of the stages mentioned above.

It has thus, for example, been suggested that a fusible interlining be produced comprising a base fabric associated to one or more thermoadhesive and/or thermocross-linkable adhesive polymer layer(s). This type of interlining is intended to be sold as it is to the manufacturer, who will bond it onto a cloth or lining using a bonding press.

However, despite the fact that the conventional presses used for heat welding pieces of fabric display an advantage in that they keep the two textile substrates (interlining and cloth) in constant and continuous contact while heating them long enough to achieve their bonding, they do not allow for a further operation, in addition to the heat welding, such as a cross-linkage reaction of the adhesive layer, for example.

Indeed, with this type of heat welding press, its design as well as the time, necessarily limited, during which the fusible interlining and the cloth must remain heated, make it impossible to successively and continuously perform both the bonding and cross-linkage operations, thus resulting in an interlining/cloth complex which does not conform to specifications, especially with respect to the absence of traverse return and its resistance to washing at high temperatures, ironing, etc.

SUMMARY OF THE INVENTION

This constraint makes it necessary to use a press having at least two distinct but successive areas and which does not require additional floor space in comparison with known state of the art presses.

A first object of the present invention is therefore to provide a bonding press which, on the one hand, makes it possible to overcome the limits or disadvantages mentioned above and which, on the other hand, requires an amount of floor space similar to that taken up by known state of the art presses, with a modified path making it possible to adapt and check the temperature in each area of this path and whose purpose is to allow for further operations in addition to heat welding.

Another object of the present invention is to provide a reliable, economical and quick bonding press requiring little maintenance.

More specifically, the purpose of the present invention is to provide a bonding press for bonding, onto a cloth, a fusible interlining comprising a base fabric associated to an adhesive layer of a type comprising both at least one bonding system and at least one cross-linkable system.

For this purpose, the invention provides a bonding press for bonding, onto a cloth, a fusible interlining comprising a base fabric associated to one or more thermoadhesive and/or thermocross-linkable adhesive polymer layer(s), of a type including a bonding area heated to the melting temperature of the polymer(s), in which the interlining-cloth complex is trapped between an upper and lower conveyor belt and then compressed between an upper and lower compressor cylinder, characterised in that the interlining-cloth complex trapped between the two conveyor belts passes through a second area heated to a temperature greater than or equal to the melting temperature of the polymer(s) so as to allow for the chemical coupling reaction of the thermocross-linkable polymers in the interlining's adhesive layer.

The first area is solely devoted to the heat welding and the second area, which makes it possible to perform additional operations (the cross-linkage of the adhesive layer once the heat welding operation has been fully completed in the first area, for example), has to be independent in order for the temperature and pressure constraints to be applied differently in the two areas.

According to a preferred embodiment of the invention, the interlining/cloth complex trapped between the two conveyor belts passes through a third area heated to a temperature greater than or equal to the melting temperature of polymer(s).

The further advantages and characteristics of the invention will be clearly understood upon reading the description which follows [in reference to the single attached figure which is a schematic side view of the bonding press according to the present invention].

BRIEF DESCRIPTION OF THE DRAWING

FIG. 1 is a schematic side view of the bonding press according to the present invention.

DESCRIPTION OF THE PREFERRED EMBODIMENTS

The invention thus concerns a bonding press for bonding, onto a cloth, a fusible interlining comprising a base fabric associated to one or more thermoadhesive and/or thermocross-linkable adhesive polymer layer(s).

The bonding press according to the present invention is intended to perform the heat welding and cross-linkage operations, thus ensuring the bonding of the interlining onto the cloth, in a successive and continuous manner.

For this purpose, the interlining and the cloth, placed one on top of the other, are transported in a continuous manner by a lower conveyor belt 2, with the cloth preferably resting directly on the lower conveyor belt 2.

In a well known manner, the bonding press comprises a bonding area A heated to the melting temperature of the thermoadhesive and/or thermocross-linkable polymer(s). In this bonding area A, the interlining/cloth complex is trapped between an upper conveyor belt 1 and the lower conveyor belt 2, and then compressed between an upper and lower compressor cylinder 3 and 4, respectively.

In others words, in this bonding area A, the interlining/cloth complex is trapped between the two conveyor belts 1 and 2 and passes through an area heated to a temperature of between 80° and 130° C., for example, for an amount of time in the order of a few seconds. In the course of this temperature rise, the polymer(s) in the adhesive layer melt or liquefy under the effect of the heat, thus mechanically clinging to the fibres of the two textile substrates (interlining and cloth) while wetting them without excessively penetrating them.

At the end of this area, the two conveyor belts 1 and 2 continue to keep the interlining/cloth complex heated, pass between the two compressor cylinders (3, 4), with the pressure applied then in the order of a few bars and for a relatively short period of time in the order of a few fractions of a second so as to achieve the adhesion and assembly of the interlining with the cloth.

According to the invention, the interlining/cloth complex trapped between the two conveyor belts 1 and 2 passes through a second area B heated to a temperature greater than or equal to the melting temperature of the polymer(s) so as to allow for the chemical coupling reaction of the cross-linkable polymers in the interlining's adhesive layer.

For this purpose, in the second area B, the lower cylinder 4 is no longer a compressor cylinder but a returning cylinder for the interlining/cloth complex trapped between the two conveyor belts 1 and 2, the purpose of this returning cylinder 4 being to invert the direction of conveyance in the second area B with respect to that in bonding area A.

In others words, the interlining/cloth complex trapped between the two conveyor belts 1 and 2 is moulded by the periphery of the returning cylinder 4 through an angular clearance of 180°.

In this second area B, no pressure is applied on the interlining/cloth complex. Only the mechanical clinging of the polymers to the fibres of the two textile substrates (interlining/cloth) obtained in area A is maintained solely due to the trapping of the interlining/cloth complex between the two belts.

The second area B is heated by heating means located substantially near the interlining's side.

By "located substantially near the interlining's side", it is understood that the heating means are in contact with upper conveyor belt 1, on which rests the interlining, as opposed to the cloth which is pressed against lower conveyor belt 2.

According to another characteristic of the invention, the interlining/cloth complex trapped between the two conveyor belts 1 and 2 passes through a third area C heated to a temperature greater than or equal to the melting temperature of the thermocross-linkable polymer(s).

The direction of conveyance in the third area C is inverted with respect to that in the second area by means of a returning cylinder 5.

As mentioned above for the second area B, in this third area C no pressure is applied on the interlining/cloth complex. Only the mechanical clinging of the polymers to the fibers of the two textile substrates (interlining/cloth) obtained in area A is maintained solely due to the trapping of the interlining/cloth complex between the two belts.

Also as mentioned above for the second area B, the third area C is heated by heating means located substantially near the interlining's side.

It is understood from the above description that upon exiting the two compressor cylinders 3 and 4, the two conveyor belts 1 and 2 keep the interlining/cloth complex assembled in close contact so as to prevent any possible displacement of the two textile substrates with respect to one another and pass through the two cross-linkage areas B and C heated to a specific temperature greater than or equal to the heat welding temperature, 150° C. for example, for the amount of time necessary, between 10 and 60 seconds for example, in order for the chemical coupling reaction of the cross-linkable system to take place, thus creating a three-dimensional cross-linked structure resistive to heat and solvents (water, chemical agents).

Preferably, the second and third areas B and C are curved so as to allow for close contact between the cloth and the interlining.

In addition, the bonding press according to the present invention comprises means for driving 6 conveyor belts 1 and 2 and for guiding 7 conveyor belts 1 and 2, arranged so as to ensure a common path for upper 1 and lower 2 conveyor belts through bonding area A and second and third areas B and C and a different path for upper 1 and lower 2 conveyor belts outside of these areas.

Furthermore, the bonding press according to the invention comprises, at the exit of second area B or third area C, a means for cooling the interlining/cloth complex (by means of air circulation, for example) so as to totally solidify the polymers.

Although only certain embodiments of the invention have been described, it is clearly understood that any modification made within the same spirit by one skilled in the art will remain within the scope of the present invention.

We claim:

1. A bonding press for bonding a fusible interlining onto a cloth comprising a base fabric associated with one or more thermoadhesive and/or thermocross-linkable adhesive polymer layer(s), an interlining, a bonding area (A) with a first direction of conveyance heated to the melting temperature of the polymer(s) through which the interlining/cloth complex is carried by and trapped between an upper (1) and lower (2) conveyor belt, after which the interlining/cloth complex is compressed between an upper (3) and lower (4) compressor cylinder, after which the interlining/cloth complex trapped between the two conveyor belts (1, 2) passes through a second area (B) with a second direction of conveyance heated to a temperature greater than or equal to the melting temperature of the polymer(s) so as to allow for the chemical coupling reaction of the thermocross-linkable polymers in the interlining's adhesive layer where the lower cylinder (4) is a return cylinder for the interlining/cloth complex trapped between the two conveyor belts (1, 2) and whose purpose is to invert the direction of conveyance in the second area (B) to the second direction which is generally opposite to the first direction in the bonding area (A), and after which the interlining/cloth complex trapped between the two conveyor belts (1, 2) passes through a third area (C) heated to a temperature greater than or equal to the melting temperature of the polymer(s) where the direction of conveyance in the third area (C) is generally opposite to the second direction in the second area (B) as caused by a second return cylinder (5).

2. A bonding press according to claim 1, characterized in that the second area (B) is heated by heating means located substantially near the interlining's side.

3. A bonding press according to claim 1, characterized in that the second area (B) is curved.

4. A bonding press according to any of claim 1, characterized in that the third area (C) is heated by heating means located substantially near the interlining's side.

5. A bonding press according to any of claim 1, characterized in that the third area (C) is curved.

6. A bonding press according to any of claim 1, characterized in that it comprises means for driving (6) conveyor belts (1, 2) and for guiding (7) conveyor belts (1, 2), arranged so as to ensure a common path for the upper (1) and lower (2) conveyor belts through the bonding area (A) and the second and third areas (B, C) and a different path for the upper (1) and lower (2) conveyor belts outside of these areas.

7. A bonding press according to any of claim 1, characterized in that it comprises, at the exit of the second area (B) or of the third area (C), a means for cooling (8) the interlining/cloth complex.

8. A bonding press for bonding a fusible interlining onto a cloth comprising:

- an upper conveyor belt and a lower conveyor belt for conveying a fusible interlining and a cloth with one or more thermoadhesive or thermocross-linkable adhesvie polymer layers where said interlining and cloth are trapped between said upper and lower conveyor belts with said adhesive layers of said cloth facing said interlining,

- a bonding area A through which said conveyor belts convey said interlining and said cloth in a first direction and where said fusible interlining and cloth are heated by a heating means to the melting temperature of the polymers to bond said cloth to said interlining,

- an upper and a lower compressor cylinder between which said conveyor belts carry said cloth and interlining to compress said interlining and said cloth together and after which said conveyor belts convey said interlining and cloth around said lower compressor cylinder,

- a bonding area B where after passing around said lower compressor cyliner, said conveyor belts convey said interlining and said cloth in a second direction, which is opposite said first direciton, through said bonding area B where said interlining and cloth are heated by a heating means to a temperature greater than or equal to the melting temperature of the polymers to allow for the chemical coupling reaction of the thermocross-linkable polymers,

- a return cylinder around which said conveyor belts convey said interlining and said cloth after passing through said bonding area B, and

- a bonding area C where after passing around said return cyliner, said conveyor belts convey said interlining and said cloth in a third direction, which is opposite said second direciton, through said bonding area C where said interlining and cloth are heated by a heating means to a temperature greater than or equal to the melting temperature of the polymers to allow for the chemical coupling reaction of the thermocross-linkable polymers.

* * * * *